(12) United States Patent
Venkatesan et al.

(10) Patent No.: US 8,171,306 B2
(45) Date of Patent: May 1, 2012

(54) UNIVERSAL SECURE TOKEN FOR OBFUSCATION AND TAMPER RESISTANCE

(75) Inventors: Ramarathnam Venkatesan, Redmond, WA (US); Vipul Goyal, Los Angeles, CA (US)

(73) Assignee: Microsoft Corporation, Redmond, WA (US)

( * ) Notice: Subject to any disclaimer, the term of this patent is extended or adjusted under 35 U.S.C. 154(b) by 322 days.

(21) Appl. No.: 12/265,197

(22) Filed: Nov. 5, 2008

(65) Prior Publication Data

US 2010/0115260 A1  May 6, 2010

(51) Int. Cl.
*G06F 21/00* (2006.01)

(52) U.S. Cl. ........ 713/187; 713/172; 713/189; 713/194; 726/9; 726/20; 726/22

(58) Field of Classification Search .................. 713/159, 713/172, 185, 187, 189, 193, 194; 726/9, 726/20, 22, 26, 30
See application file for complete search history.

(56) References Cited

U.S. PATENT DOCUMENTS

| | | | |
|---|---|---|---|
| 6,192,475 B1 * | 2/2001 | Wallace | 713/190 |
| 6,567,917 B1 * | 5/2003 | Ziese | 713/187 |
| 6,842,862 B2 * | 1/2005 | Chow et al. | 713/190 |
| 7,051,200 B1 | 5/2006 | Manferdelli et al. | |
| 7,263,722 B1 | 8/2007 | Luo | |
| 7,373,506 B2 * | 5/2008 | Asano et al. | 713/168 |
| 7,383,443 B2 * | 6/2008 | Zeman et al. | 713/190 |
| 7,397,916 B2 * | 7/2008 | Johnson et al. | 380/28 |
| 7,430,668 B1 * | 9/2008 | Chen et al. | 713/187 |
| 7,434,260 B2 * | 10/2008 | Hong et al. | 726/22 |
| 7,739,519 B2 * | 6/2010 | Matsuzaki et al. | 713/193 |
| 7,757,097 B2 * | 7/2010 | Atallah et al. | 713/187 |
| 7,774,619 B2 * | 8/2010 | Paaske et al. | 713/191 |
| 7,809,135 B2 * | 10/2010 | Johnson et al. | 380/44 |
| 7,877,604 B2 * | 1/2011 | Van Dijk et al. | 713/168 |
| 7,937,595 B1 * | 5/2011 | Kumar et al. | 713/192 |
| 8,009,829 B2 * | 8/2011 | Jueneman et al. | 380/28 |
| 2004/0255132 A1 * | 12/2004 | Venkatesan et al. | 713/190 |
| 2006/0048223 A1 | 3/2006 | Lee et al. | |
| 2006/0072762 A1 * | 4/2006 | Buer | 380/277 |
| 2006/0095953 A1 * | 5/2006 | Frank | 726/1 |
| 2006/0195703 A1 | 8/2006 | Jakubowski | |
| 2006/0235956 A1 * | 10/2006 | Kawaguchi et al. | 709/223 |
| 2006/0294391 A1 * | 12/2006 | Wu | 713/182 |
| 2007/0234070 A1 * | 10/2007 | Horning et al. | 713/190 |
| 2008/0072066 A1 * | 3/2008 | Vogler et al. | 713/187 |
| 2008/0260163 A1 * | 10/2008 | Yushiya | 380/279 |
| 2009/0158051 A1 * | 6/2009 | Michiels et al. | 713/189 |
| 2009/0249080 A1 * | 10/2009 | Zhang et al. | 713/187 |

(Continued)

OTHER PUBLICATIONS

Chakraborty, Rajat Subhra; Bhunia, Swarup; "Hardware Protection and Authentication Through Netlist Level Obfuscation", IEEE/ACM International Conference on Computer-Aided Design, 2008, pp. 674-677.*

(Continued)

*Primary Examiner* — Carl Colin
*Assistant Examiner* — Victor Lesniewski
(74) *Attorney, Agent, or Firm* — Lee & Hayes, PLLC

(57) ABSTRACT

Program obfuscation is accomplished with tamper proof token including an embedded oracle. A public obfuscation function can be applied to any program/circuit to produce a new obfuscated program/circuit that makes calls to the corresponding oracle to facilitate program execution. A universal circuit representation can be employ with respect to obfuscation to hide circuit wiring and allow the whole circuit to be public. Furthermore, the token or embedded oracle can be universal and stateless to enable a single token to be employed with respect to many programs.

16 Claims, 13 Drawing Sheets

U.S. PATENT DOCUMENTS

2010/0031064 A1* 2/2010 Walmsley ............... 713/194
2010/0058060 A1* 3/2010 Schneider ............... 713/171

OTHER PUBLICATIONS

Goyal, Vipul; Ishai, Yuval; Sahai, Amit; Venkatesan, Ramarathnam; Wadia, Akshay; "Founding Cryptography on Tamper-Proof Hardware Tokens", Theory of Cryptography, Lecture Notes in Computer Science, 2010, vol. 5978, 46 pages.*

Mahmoody-Ghidary, Mohammad; "Studies in the Efficiency and (versus) Security of Cryptographic Tasks", Princeton University Dissertation, Sep. 2010, ProQuest LLC, 315 pages.*

Arvind Narayanan, et al., On the Limits of Point Function Obfuscation http://eprint.iacr.org/2006/182.pdf. Last accessed on Sep. 2, 2008, 19 pages.

Anderson, "On the Secure Obfuscation of Deterministric Finite Automata" <<http://eprint.iacr.org/2008/184.pdf>> 32 pages. Received Apr. 23, 2008. Last revised Jun 2, 2008.

Goldwasser, et al., "On Best-Possible Obfuscation".<<http://citeseerx.ist.psu.edu/viewdoc/download?doi=10.1.1.86.4265&rep=rep1&type=pdf>> 2007. Retrieved on Oct. 27, 2010. 22 pages.

Thompson, et al., Semantic Encryption Transformation Scheme. Proceedings of the 2004 International Workshop on Security in Parallel and Distributed Systems. 6 pages. San Francisco, CA. Sep. 2004.

* cited by examiner

UNIVERSAL SECURE TOKEN FOR OBFUSCATION AND TAMPER RESISTANCE

BACKGROUND

The problem of program obfuscation is to transform the code of a program so as to make it essentially "unintelligible" while still preserving its functionality. In other words, given an obfuscated program, an attacker should be able to do no more than observe its input output behavior. Such a requirement is most naturally formalized using a "virtual black box" definition: anything that can be efficiently computed given the obfuscated program can also be efficiently computed given only oracle access to the program.

Program obfuscation is a problem of fundamental importance. An obfuscated program is like a trusted party; you can execute it to perform tasks that it is intended for, however, it will refuse to do anything else (with the secrets it has). While the most obvious application of program obfuscation is for various forms of software production, given a program obfuscation scheme (and some basic primitives like a symmetric key encryption scheme), it is also possible to design a whole array of advanced cryptography primitives. Among the primitives, which can be constructed using program obfuscation are: public key encryption, identity based encryption, attribute based and predicated based encryption, etc. In addition, an obfuscation scheme (under the most natural virtual black box definition) would allow one to remove random oracles from various cryptography constructions to obtain constructions secure in the standard model.

While various heuristic techniques to obfuscate programs exist, their main results are disappointingly negative. In particular, it was shown that program obfuscation under the virtual black box definition (and some of its natural variants) is impossible. In particular, a family of unobfuscatable functions was exhibited where any source code implementing the function gives the attacker a significant advantage over if he only had oracle access to the function. Subsequently, a somewhat stronger definition was considered and impossibility results were significantly expanded to cover a large class of functionalities. In sharp contrast to these negative results, positive results on obfuscation have been relatively rare and known only for very specific functionalities.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to employment of universal secure tokens for obfuscation as well as tamper resistance. More specifically, a token can include a secret obfuscation complete oracle that corresponds to a public obfuscation function. Obfuscated programs resulting from application of the public obfuscation function can make calls during execution to the token and embedded oracle to facilitate program evaluation. In accordance with one aspect of the disclosure, a token, and associated oracle, can be stateless to enable employment of a single token by multiple programs.

According to another aspect of the disclosure, a universal circuit can be employed with respect to program obfuscation that prevents leakage of information regarding circuit interconnections thereby allowing an obfuscated program to be public. In particular, the universal circuit can reduce an obfuscation problem from hiding a program to hiding input to the program. Accordingly, whatever can be computed given access to an obfuscated program and an associated oracle can also be computed given access to an oracle implementing the functionality of the program.

In accordance with yet another aspect of the disclosure, tamper resistant functionality can be injected within an obfuscation/de-obfuscation process. For instance, message authentication codes (MACs), among other things, can be employed to enable detection of unauthorized input and/or program modification.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods pertaining to program obfuscation are described in detail hereinafter. A public obfuscation function can be employed to obfuscate a program. The obfuscated program can make calls during execution to a secret oracle corresponding to the obfuscation function embedded in a tamper proof token or the like. In accordance with one aspect, the token and corresponding oracle can be stateless to enable employment of a single token with respect to multiple programs. Further, a universal circuit can be employed in conjunction with obfuscation to hide wire interconnections and enable the obfuscated program to be public. Still further yet, tamper resistance functionality can be injected in the obfuscation process at various stages in accordance with an aspect of the disclosure.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
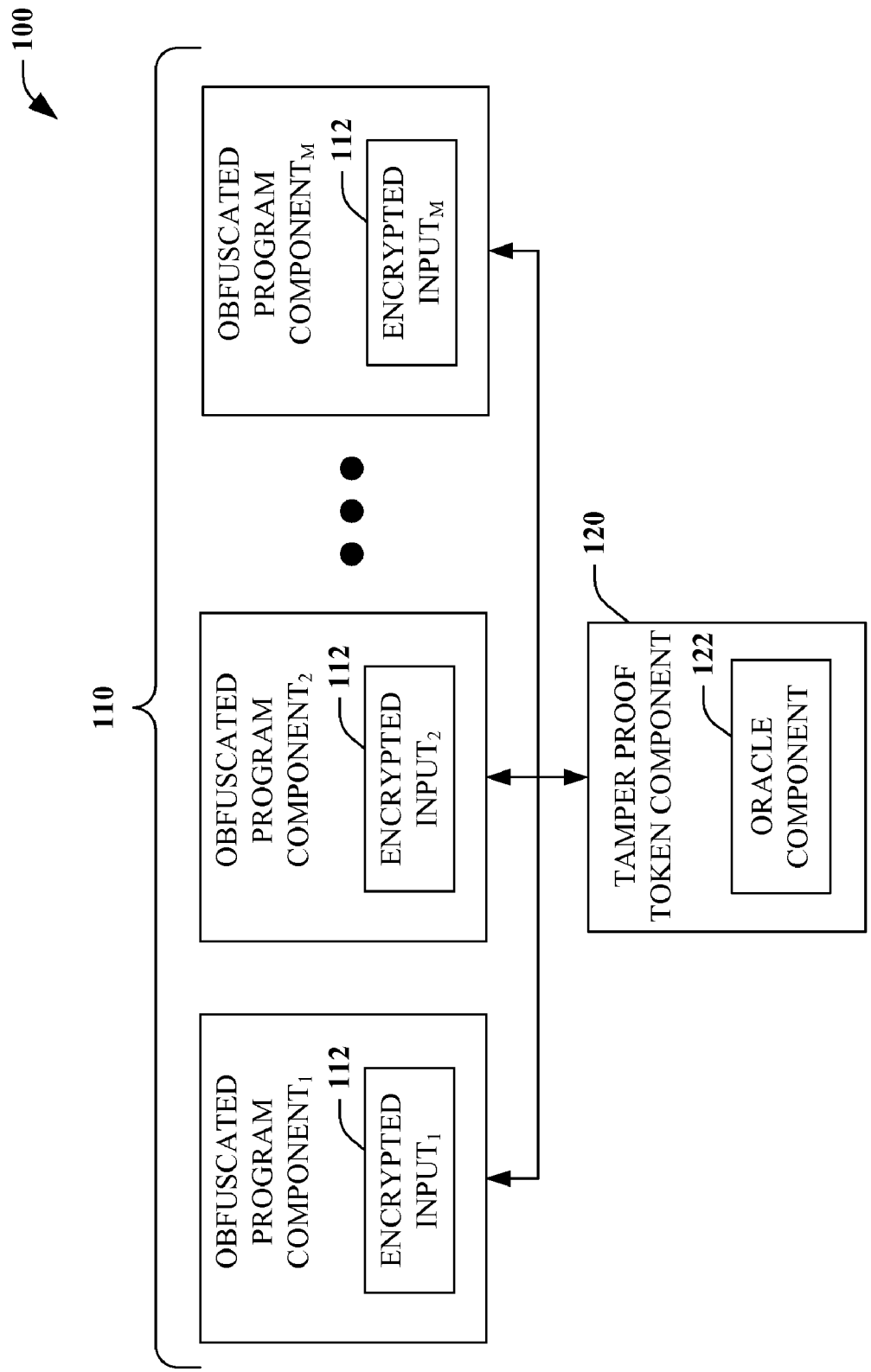
FIG. 1 is a block diagram of a program obfuscation system in accordance with an aspect of the disclosed subject matter.

Referring initially to FIG. 1, a program obfuscation system 100 is illustrated in accordance with an aspect of the claimed subject matter. In general, obfuscation can be employed to transform program code into a substantially unintelligible form while still preserving its functionality to prevent reverse engineering and/or unauthorized program usage, among other things. For example, obfuscation can be employed to at least discourage modification of a program to remove a license verification or digital rights management (DRM) component to enable employment of files (e.g., music, video . . . ) or program features without purchasing a license.

Here, the system 100 includes a plurality of obfuscated program components 110 (OBFUSCATION PROGRAM COMPONENT$_1$ to OBFUSCATION PROGRAM COMPONENT$_M$, where "M" is an integer greater than or equal to one) and a single tamper proof token component 120. Further, the obfuscated program components 110 can operate over or with respect to encrypted input 112 (ENCRYPTED INPUT$_1$ to ENCRYPTED INPUT$_N$, where "N" is greater than or equal to one). Oracle component 122 can be embedded within the token 120 and provide functionality to facilitate execution of obfuscated program components 110 with respect to encrypted input 112, among several other things as will be described further infra. Accordingly, the oracle component 122 can include functionality for de-obfuscating and de-encrypting, a program and input thereto.

In accordance with an aspect of the claimed subject matter, the tamper proof token component 120 can be embodied in hardware. For example, the token can be a hardware token or the like such that it could by physically carried around by a user and plugged into a computer. Additionally or alternatively, the token 120 could be embedded with physical components of a computer or like device. For example, an original equipment manufacture (OEM) could embed the token or functionality thereof within hardware of a computer or other processor based device. According to another embodiment, the tamper proof token component 120 can be implemented in software where the behavior achieved with respect to a hardware implementation is emulated or mimicked by the software. Of course, the same level of security might not be achievable in software as would be possible with a hardware embodiment.

In accordance with another aspect of the claimed subject matter, the token component 120 and associated oracle component 122 can be universal and/or stateless. Among other things, this allows a single token component 120 or oracle component 122 to operate with respect to multiple programs components 110 as shown in FIG. 1. Furthermore, the program components 110 can interact with the token component 120 concurrently or at substantially the same time via time-sharing or like approaches, for instance. In this manner, a single token 120 can be provided and employed to obfuscation/de-obfuscate and/or encrypt/decrypt programs and input, respectively.

According to yet another aspect, restrictions can be placed on queries to the token 120 and/or embedded oracle component 122. More specifically, the oracle component 122 can be configured to accept queries of a set size from obfuscated programs 110. Of course, this is only one embodiment and the claims are not limited thereto.

Figure 2:
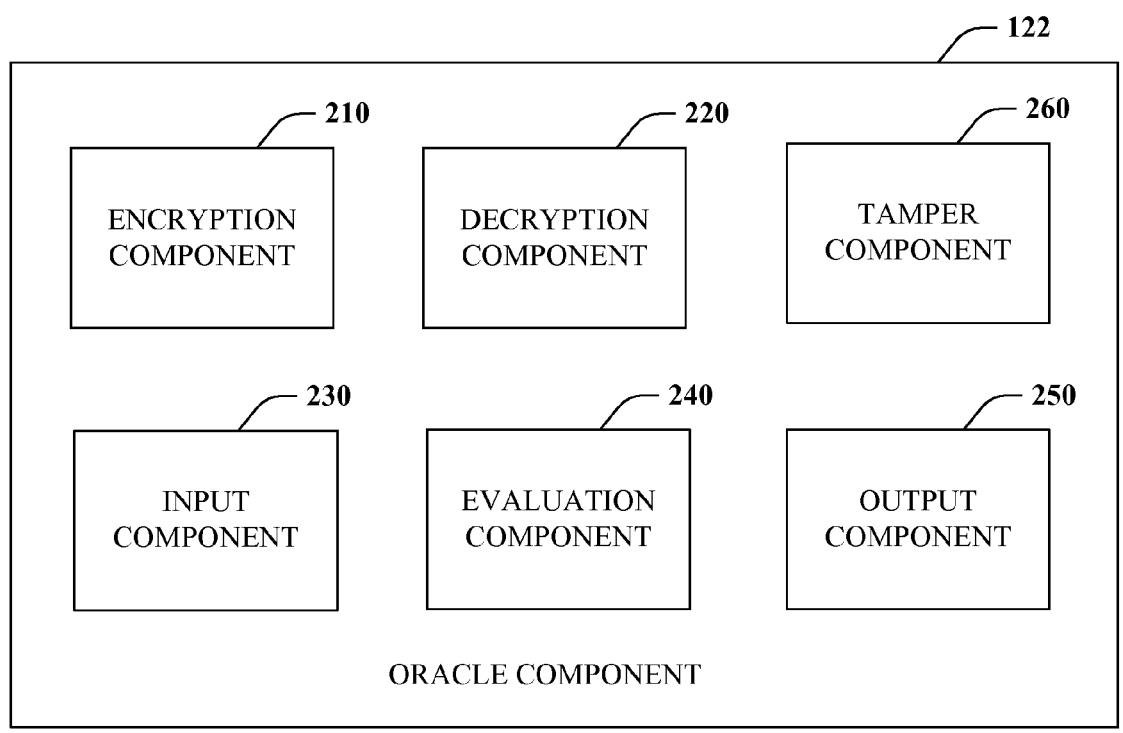
FIG. 2 is a block diagram of a representative oracle component according to a disclosed aspect.

FIG. 2 illustrates a representative oracle component 122 in accordance with an aspect of the claimed subject matter. As shown, the oracle component 122 includes encryption component 210, decryption component 220, input component 230, evaluation component 240, output component 250, and tamper component 260. The oracle component 122 can receive and respond to a plurality of queries from obfuscated programs. The aforementioned components or sub-components can provide functionality to facilitate processing of such queries.

The encryption component 210 and decryption component 220 enable the oracle component 122 to perform encryption and decryption operations, respectively. For example, decryption component 220 can enable de-obfuscation where a program is encrypted utilizing a public-private encryption scheme. In such a situation, obfuscation can be accomplished utilizing a public key, which can be undone utilizing a corresponding private or secret key known only by the oracle component 122. Further yet, other messages and interactions between the oracle component 122 and one or more obfuscated programs can be subject to encryption and decryption. In fact, in accordance with one aspect of the claimed subject matter, the oracle component 122 can receive and output only encrypted messages, except when final output in needed.

The input component 230 is a mechanism for encrypting program input. Among other things, input encryption can seek to prevent input alteration before, during, or after program execution. Accordingly, upon receipt of one or more queries regarding input encryption, the input component 230 in conjunction with encryption component 210 can produce encrypted program input as a return result. Of course, actual encryption can vary as a function of particular obfuscation embodiments. Furthermore, it is to be noted that the input component 230 can also encrypt a description or the like of a program/circuit where as universal circuit is employed as will be described further infra.

The evaluation component 240 is a mechanism for evaluation or processing of at least a portion of a program. Upon receipt of input and an operation from a program, the evaluation component 240 can apply the operation to the input and produce an output. As previously mentioned, the input and operation provided by a program can be received in an encrypted format that can require interaction with the decryption component 220 to reveal values. Subsequently, the produced output can be encrypted by the encryption component 210 and returned to the querying program. Furthermore and as will be described later, the evaluation component 230 can include functionality to facilitate operation with respect to a universal circuit.

The output component 250 can accept and process queries requesting program output. Receiving encrypted queries and returning encrypted results can facilitate obfuscation by obscuring operation, but in the end, the program needs to produce comprehensible results. Accordingly, the output component 230 can interact with decryption component 220 to produce decrypted output.

In addition to obfuscation, the oracle component 122 can afford tamper resistant techniques to further protect a program and execution thereof from undesired utilization. The tamper component 260 provides this functionality and can include numerous sub-components afford and support this functionality (e.g., pseudorandom number generator). By way of example and not limitation, the tamper component can employ message authentication codes (MACs) to detect unauthorized modification with respect to an obfuscated program or associated input. More specifically, MACs can be employed in conjunction with input encryption, program evaluation, and/or output decryption, among other things. Of course, other tamper detection/resistance techniques can also be employed. For instance, prior to returning decrypted output in response to a query, the tamper component 260 can verify that requested values are actually output values in addition to employ a MAC or other mechanism to ensure an originally computed output has not been modified.

In accordance with one embodiment, the tamper component 260 can enable employment of a secret obfuscation identity ($O_{ID}$) or a random nonce selected while preparing an obfuscated program or circuit. Problems can exist when a user is an active adversary. While a circuit is being evaluated, a user can change the value on any wire, for instance, by encrypting the desired value from scratch with a public key and using that for all future queries. Furthermore, a he/she could replace the encrypted value on one wire with the value on another, or could launch a cipher text malleability attach to try and change the value on the wire. Fortunately, such problems can be solved utilizing a secrete obfuscation identity. By way of example and not limitation, an obfuscation identity can be encrypted along with each wire value (so that an adversary cannot re-encrypt the desired bit from scratch), having a unique number such for each wire in the circuit (so that an adversary cannot replace a value on one wire with that on another), also encrypting the description of a the circuit in some way (so that an adversary cannot modify the unique wire numbers), using secure encryption, among other things.

Furthermore, the tamper component 260 can enable employment of an execution identity ($E_{ID}$) to facilitate security across multiple executions. One significant problem can involve an adversary utilizing an encrypted wire value obtained in one execution of the circuit to modify the corresponding wire value in another execution. To illustrate this problem the following example is provided: Consider a circuit "C" which has a secret signing key built inside. "C" takes as input a string "m" of some fixed size and outputs a signature on it if and only if "m" is an even number. The circuit "C" has two parts. The first part checks whether the input is even and sets a flag wire to be "1" if true. The second part uses this flag value and outputs a signature if and only if it is "1". Now, the circuit can be obfuscated.

Clearly, in an ideal world, an adversary can produce a signature on an odd number only with negligible probability. However, in the real world, the adversary can first execute the circuit with an even number as input and store the encrypted wires. Next, an adversary executes the circuit with an odd number. Indeed, the first part will execute and set the value on the flag wire to be "0". However at this point, the adversary can use the encrypted wire values obtained in the previous execution (where the flag was "1") to try to modify the wire values in the current execution. Thus, if the adversary is successful in changing the flag value coming from the first part, the second part of "C" will output a signature on the odd number. While this toy example already illustrates the problem, it is to be noted that an adversary can launch even more sophisticated attacks in which he/she iteratively changes the wire values and observes the output. In fact, it may be possible to completely recover source code (or the description of a circuit) whose input/output behavior is consistent with the input/output behavior of "C" observed so far.

The problem can be fixed with a stateful oracle as follows. The oracle will additionally insert a nonce (randomly generated for each execution) in all the encrypted wire values for an execution. The oracle will answer a query if and only if the encrypted wire values specified in the request have the right nonce. Now, since except with negligible probability, two different executions of the obfuscated circuit will have different nonce values, the encrypted wires obtained from one execution are not useful in another. However, in accordance with an aspect of the claimed subject matter, the oracle can be stateless. In other words, the oracle treats all queries uniformly and is oblivious to which queries belong to which execution, how many executions there are, etc, among other things to enable one token to handle many programs. To solve this problem, a different mechanism is provided through which a stateless oracle is able to assign a single random nonce or execution identity for an entire execution. The mechanism ensures that it is hard to have two different executions of the circuit for the same execution identity. In other words, fixing the execution identity essentially fixes the value on all wires of the circuit being evaluated.

Figure 3:
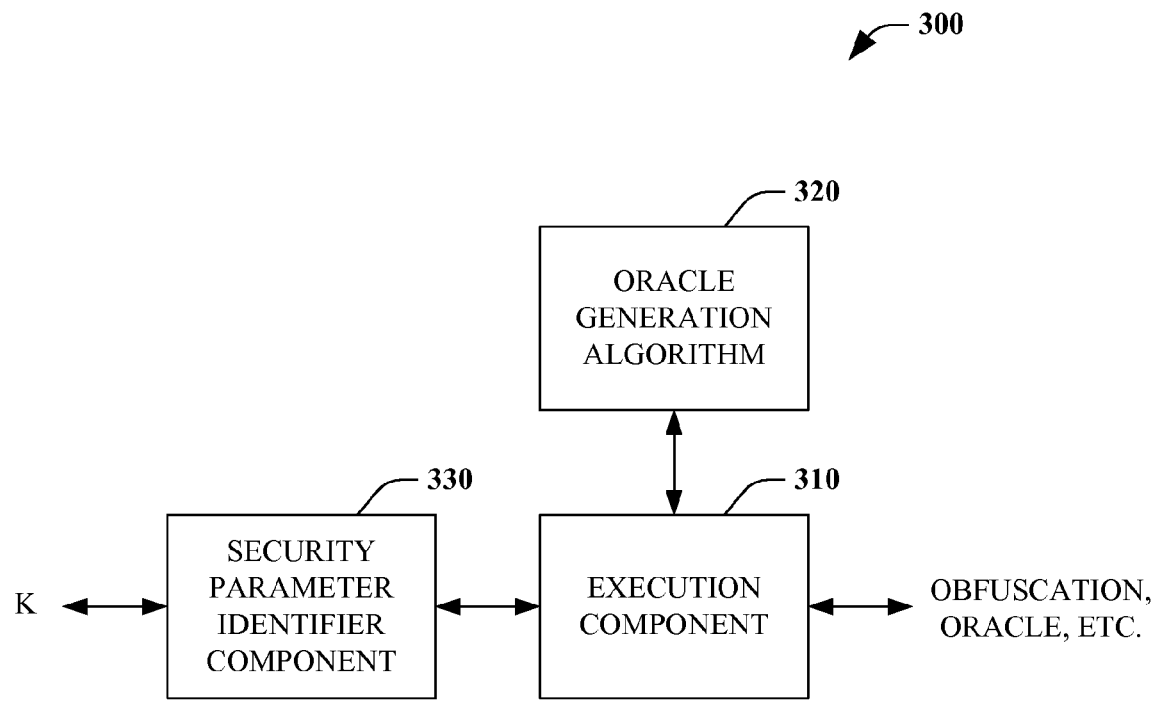
FIG. 3 is a block diagram of an oracle generation system in accordance with an aspect of the disclosure.

Turning attention to FIG. 3, an oracle generation system 300 is depicted in accordance with an aspect of the claimed subject matter. The system 300 includes an execution component 310 that receives as input an oracle generation algorithm 320, which is executed or otherwise evaluated by the execution component 310. Furthermore, the system 300 includes a security parameter component 330 that receives, retrieves or otherwise acquires a security parameter and provides or otherwise makes the parameter available to the execution component 310. The security parameter controls the complexity and the degree of obfuscation and/or security, among other things. The execution component 310 can return a public obfuscation function or component, an oracle component (also referred to as obfuscation complete oracle, obfuscation complete circuit, or secret obfuscation complete oracle), and potentially other information.

In accordance with one particular formalized embodiment, a randomized oracle algorithm "OracleGen" can be executed with respect to a security parameter "k", "OracleGen($1^k$)", resulting in a tuple "(T, $\mathcal{O}^T$)". Here, "T" corresponds to a description of a secret obfuscation complete circuit, while "$\mathcal{O}^T$" is a function (or description of a Turing machine) called the public obfuscation function. The tuple "(T, $\mathcal{O}^T$)" can exhibit properties including functionality preservation, polynomial slowdown, and virtual black box security.

The application of function "$\mathcal{O}^T(\ )$" to a circuit "C" results in an obfuscated oracle circuit "$\mathcal{O}^T(C)$", which during execution can make calls to the oracle "$\mathcal{T}$" implementing the functionality of "T". The obfuscated oracle circuit "$\mathcal{O}^T(C)$" can preserve the same functionality as the circuit "C". In other words, "$\forall$ C, $\forall$ x" "$\mathcal{O}^T(C) = C(x)$".

As per polynomial slowdown, there exists polynomials "p" and "q" such that for sufficiently large security parameter "k" and "|C|" the following relationships are true: "$|\mathcal{O}^T(C)| \leq p(|C|, k)$" and "$|T| \leq q(k)$". Accordingly, the size of the circuit "T" is dependent solely on the security parameter.

For every probabilistic polynomial time Turing machine (PPT) adversary "A", there exists a PPT simulator "Sim" and a negligible function "negl( )" such that for every PPT distinguisher "D", for every circuit "C", and for every polynomial size auxiliary graph "z":

$$Pr[D(A^T(\mathcal{O}^T(C), z), z) = 1] - Pr[D(\text{Sim}^C(1^{|C|}, T, z), z) = 1] \leq \text{negl}(k)$$

Stated differently, the output distribution of the adversary "A" and the simulator "Sim" are computationally indistinguishable.

Figure 4:
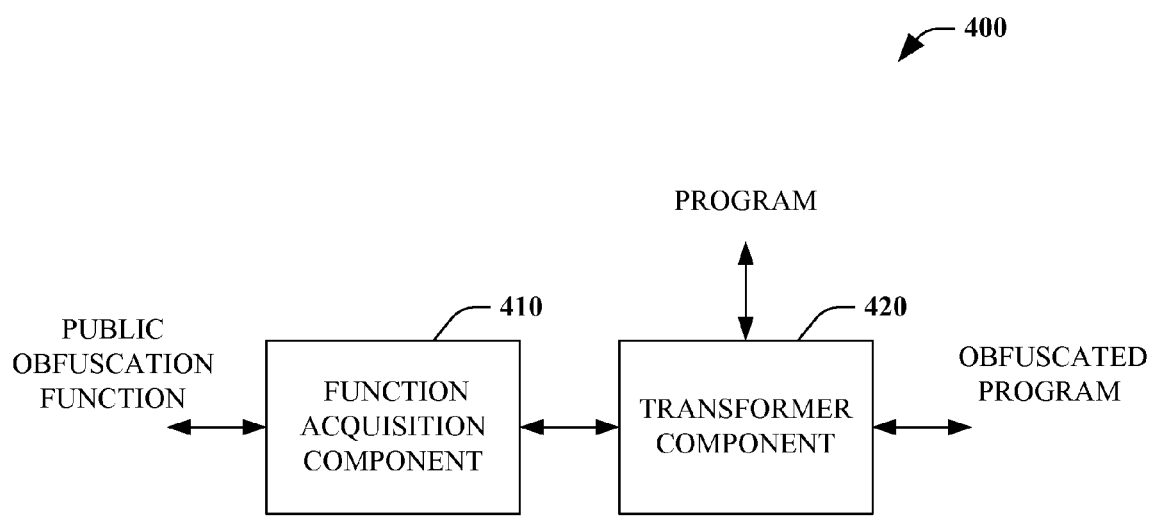
FIG. 4 is a block diagram of a program obfuscation system according to a disclosed aspect.

FIG. 4 is a block diagram of a program obfuscation system 400 in accordance with an aspect of the claimed subject matter. Function acquisition component 410 is a mechanism for receiving, retrieving, or otherwise acquiring an obfuscation function. For example, the obfuscation function can be acquired from a public obfuscation infrastructure, designated authority, and/or from a specific user. Transformer component 420 employs the acquired obfuscation function and applies it over a program to transform the program into an obfuscated version thereof.

Continuing with the formal embodiment previously described, the obfuscation function "$\mathcal{O}^T$" can be applied to a circuit "C" representation of a program. Without loss of generality and for purpose of clarity and understanding, "C" can include solely fan-in NAND gates. The circuit "C" can thus implement the function "C: $\{0,1\}^m \to \{0,1\}^{m'}$". Given the input circuit "C", the output is a new oracle circuit "$\mathcal{O}^T(C)$".

In accordance with one embodiment, the function "$\mathcal{O}^T$" can transform the program into an encrypted universal circuit. Specifically, let "U" be a universal circuit implementing the function "U: $\{0,1\}^m \times \{0,1\}^{|C|} \to \{0,1\}^{m'}$" such that "U(x, C)=C(x)". Input and output wires of the circuit "U" can be uniquely numbered such that "m+|C|" input wires are assigned numbers from "1" to "m+|C|" and "n" output wires can be assigned numbers from "m+|C|+1" to "m+|C|+n". The numbers assigned to the internal wires can be arbitrarily long as the wires in the circuit have unique numbers. In other words, a wire "w" is an input wire if and only if "w $\in$ [m+|C|]" and if and only if "w $\in$ {m+|C|+1, . . . , m+|C|+n}". A random obfuscation identity "$O_{ID}$" can be selected such that $|O_{ID}|$ is at least super-logarithmic in the security parameter "k". Now for each gate "g" in the circuit "U" (defined by input wires a, b, and output wire c), cipher text "$C_g = Enc_P(a, b, c, OID)$" is computed where "$Enc_P(m)$" represents a secure encryption (e.g., CCA-2) of message "m" with public key "P". Further, for each wire "w" such that "w $\in$ {m+1, . . . , m+|C|}", cipher text "$Cw = Enc_P(w, OID, b_w)$" is computed where "$b_w$" is the $(w-m)^{th}$ bit of the circuit "C" (when represented as an input string for universal circuit U). Finally, header cipher text "$C_h = Enc_P(O_{ID}, m, |C|, n)$" is computed. Given this set of cipher texts, the algorithm "$\mathcal{O}^T$" can output an obfuscated oracle circuit "$\mathcal{O}^T(C)$".

Figure 5:
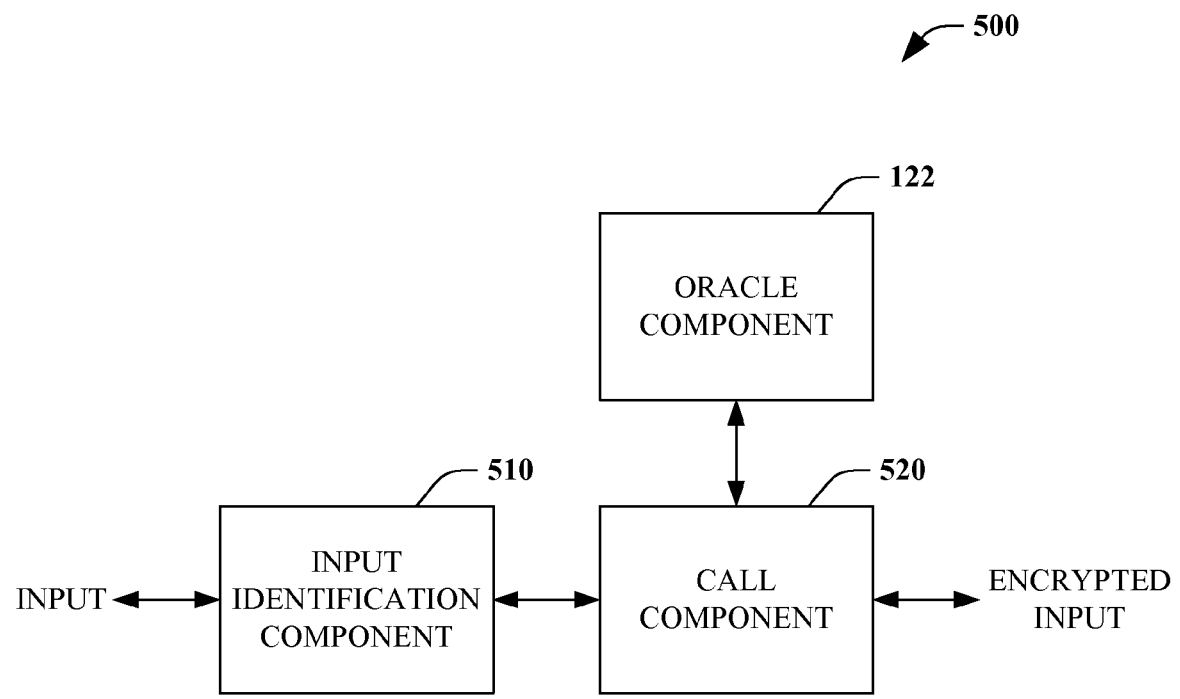
FIG. 5 is a block diagram of an input encryption system in accordance with an aspect of the disclosure.

FIG. 5 illustrates an input encryption system 500 in accordance with an aspect of the claimed subject matter. Program input is identified by input identification component 510. For example, input can be identified just prior to program execution. Upon input identification, call component 520 can issue a query or call to an oracle 122 and return results. Here, the query and returned results correspond to an encrypted version of input or a portion thereof. Among other things, this can guard against changes to input before, after or during processing as well as provide a degree of program obfuscation. Furthermore, it should be appreciated that where a universal circuit is employ the input can also include a description of a circuit or the like.

The functionality associated with system 500 can be implemented in a variety of manners. However, continuing with the previous formal embodiment input encryption can be accomplished as follows: For each "i $\in$ |m|", "$H_i = H(H_{i-1}, x_i, i)$" is computed. Here, "H" is a collision resistant hash function (CRHF), where "$H_0$" is an all zero string of appropriate length, and "$x_i$" is the $i^{th}$ bit of the string "x". CRHFs are assumed solely for simplicity. Later, a description is provided about hot relax this assumption to use universal one-way functions (UOWHFs). A query can be made to the oracle "$\mathcal{T}$" 122 sending the computed "$H_m$" and the header cipher text "$C_h$". Upon receiving the query, the oracle "$\mathcal{T}$" 122 can assign an execution identity associated with the particular input "x" as follows. Oracle "$\mathcal{T}$" 122 first recovers the values "$O_{ID}$", "m", "|C|", and "n" by decrypting "$C_h$" with a secret key "S". The oracle then selects a random execution identity "$E_{ID}$" by applying an inbuilt pseudorandom function "G", for instance, on the string "$H_m \| O_{ID} \| m \| (|C|) \| n$" (where $\|$ denotes concatenation). The oracle 122 can also compute cipher text "$M_m = Enc_P(H_m, E_{ID}, m, |C|, n)$" and outputs "$M_m$, $Mac_K(Mm)$", where $Mac_K(m)$ represents a secure MAC of the message "m" computed with key "K".

For "i $\in$ {m, . . . , 1}" the obfuscated oracle circuit "$\mathcal{O}^T(C)$" makes a query by sending "$M_i, Mac_K(M_i), H_{i-1}, x_i, i$" to the oracle "$\mathcal{T}$" 122. A query of this type is used to generate encryption of input wires "1" to "m" as follows. Upon receiving such a query, "$\mathcal{T}$" 122 first recovers "$H_i, E_{ID}, O_{ID}, m, |C|, n$" from "$M_i$" and verifies that (a) "$Mac_K(M_i)$" is a valid MAC of $M_i$ with the key "K", (b) "$H_i = (H_{i-1}, x_i, i)$", and (c) "i $\leq$ m". The oracle outputs an error if any of these checks fail. The oracle "$\mathcal{T}$" 122 then computes "$E_i = Enc_P(i, O_{ID}, E_{ID}, x_i)$" and outputs "$E_i, Mac_K(E_i)$". If "i>1", "$\mathcal{T}$" 122 further computes "$M_{-1} = Enc_P(H_{i-1}, E_{ID}, O_{ID}, m, |C|, n)$" and outputs "$M_{i-1}, Mac_K(M_{i-1})$".

For "i $\in$ {m+1, . . . , m+|C|}", the circuit "$\mathcal{O}^T(C)$" makes a query to the oracle 122 by sending "$(M_m, Mac_K(M_m))$" and "$C_i$". A query of this type is used to generate the encryption of inputs wires from "m+1" to "m+|C|". Upon receiving such a query, "$\mathcal{T}$" 122 recovers "$E_{ID}, O_{ID}, b_i$" from "$M_m$" and "$C_i$" and ensures that the associated MAC is valid and that "i $\in$ {m+1, . . . , m+|C|}". The oracle 122 then computes "$E_i = Enc_P(i, O_{ID}, E_{ID}, b_i)$" and outputs "$E_i, Mac_K(E_i)$".

Recall that the input to the universal circuit "U" is "x'=x$\|$C". At the end of input encryption, the circuit "$\mathcal{O}^T(C)$" has computed "$E_i = Enc_P(i, O_{ID}, E_{ID}, x'_i)$" and "$Mac_K(E_i)$" for each input wire "i" of the universal circuit.

To complete the formal embodiment example, the evaluation of the universal circuit "U" can be done gate by gate in the natural order by issuing a query to the oracle 122 for each gate "g". For a gate "g" (defined by the incoming wires "a", "b" and the outgoing wire "c"), issue a query sending "$E_a, Mac_K(E_a), E_b, Mac_K(E_b), C_g$ to "$\mathcal{T}$" where "$E_a = Enc_P(a, O_{ID}, E_{ID}, v_a)$" and "$E_b = Enc_P(b, O_{ID}, E_{ID}, v_b)$". After appropriate checks, the oracle "$\mathcal{T}$" 122 replies back with "$E_c = Enc_P(c, O_{ID}, E_{ID}, v_c)$ where "$v_c = v_a$ NAND $v_b$". In the end, the circuit "$\mathcal{O}^T(C)$" has computed "$E_i = Enc_P(i, O_{ID}, E_{ID}, v_i)$" and "$Mac_K(E_i)$" for each output wire "i" of the universal circuit.

The actual output is computed from the encrypted output wires by using one or more queries. For each output gate "i", a query is issued sending "$Ei = Enc_P(i, O_{ID}, E_{ID}, v_i), Mac_K(E_i)$" and "$C_h$" to the oracle 122, which decrypts "$E_i$" and "$C_h$", verifies that "i" is indeed an output wire (e.g., m+|C|+1_i_m+|C|+n) and that the given MAC is valid and finally outputs the output wire value "$v_i$".

CRHFs are assumed above solely for simplicity. Modifications can be made to relax the CRHF assumption and allow use of UOWHFs. For example, instead of letting a user choose the value on which "H" is being applied, the oracle component 122 can supply a random string of its own to be hashed along with user values. Thus, while constructing the hash chain, the user would query the oracle component with "$(H_{i-1}, x_i, i)$" and get a random number to be hashed along with it to compute "$H_i$" (this random number can be checked for correctness by the oracle during a hash chain unwinding process). Using known techniques, it can be shown that the UOWHF property is sufficient for proving security of this modified construction. UOWHFs, in turn, are known to exist based on any one-way function.

The aforementioned systems, architectures, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the tamper component 260 can implement such mechanism to facilitate identifying, determining and/or inferring program tampering.

In view of the exemplary systems described supra, methodologies that may be implemented in accordance with the disclosed subject matter will be better appreciated with reference to the flow charts of FIGS. 6-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 6:
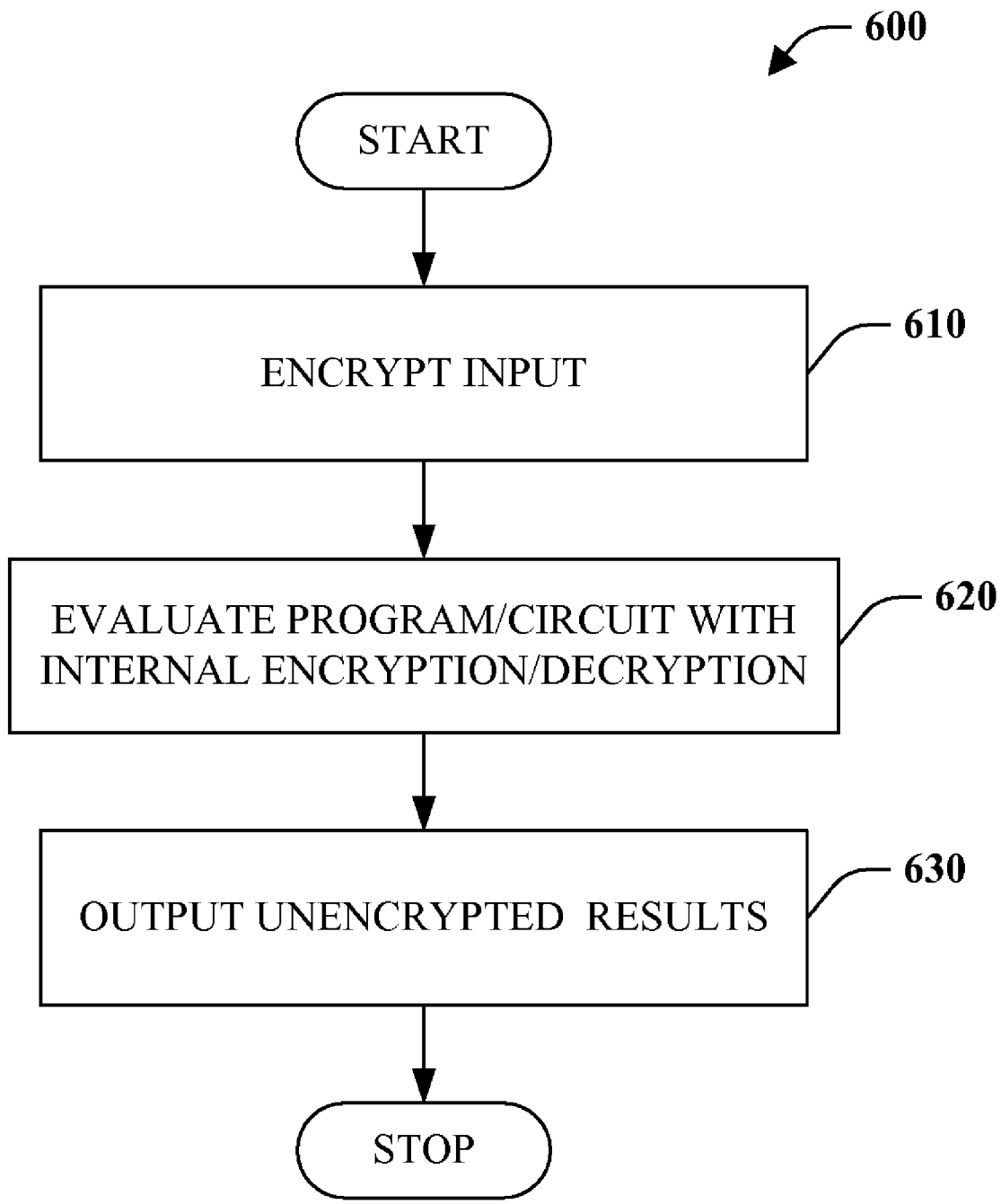
FIG. 6 is a flow chart diagram of a method of obfuscated program processing according to a disclosed aspect.

Referring to FIG. 6, a method of obfuscated program processing 600 is illustrated in accordance with an aspect of the claimed subject matter. At reference numeral 810, program input is encrypted. In one instance, this can be accomplished by issuing one or more queries including input data to an oracle including encryption functionality. Among other things, input encryption can protect against input modification as well as provide a degree of program obfuscation. At numeral 820, a program is evaluated with respect to input with internal encryption and decryption. In other words, input and output can be provided in an encrypted format, and internal processing can employ encryption and decryption algorithms as needed. At reference numeral 830, output is transformed from an encrypted to an unencrypted form to enable usage of computations. The method 600 thus describes a three-phase obfuscation scheme according to an aspect of the claimed subject matter.

Figure 7:
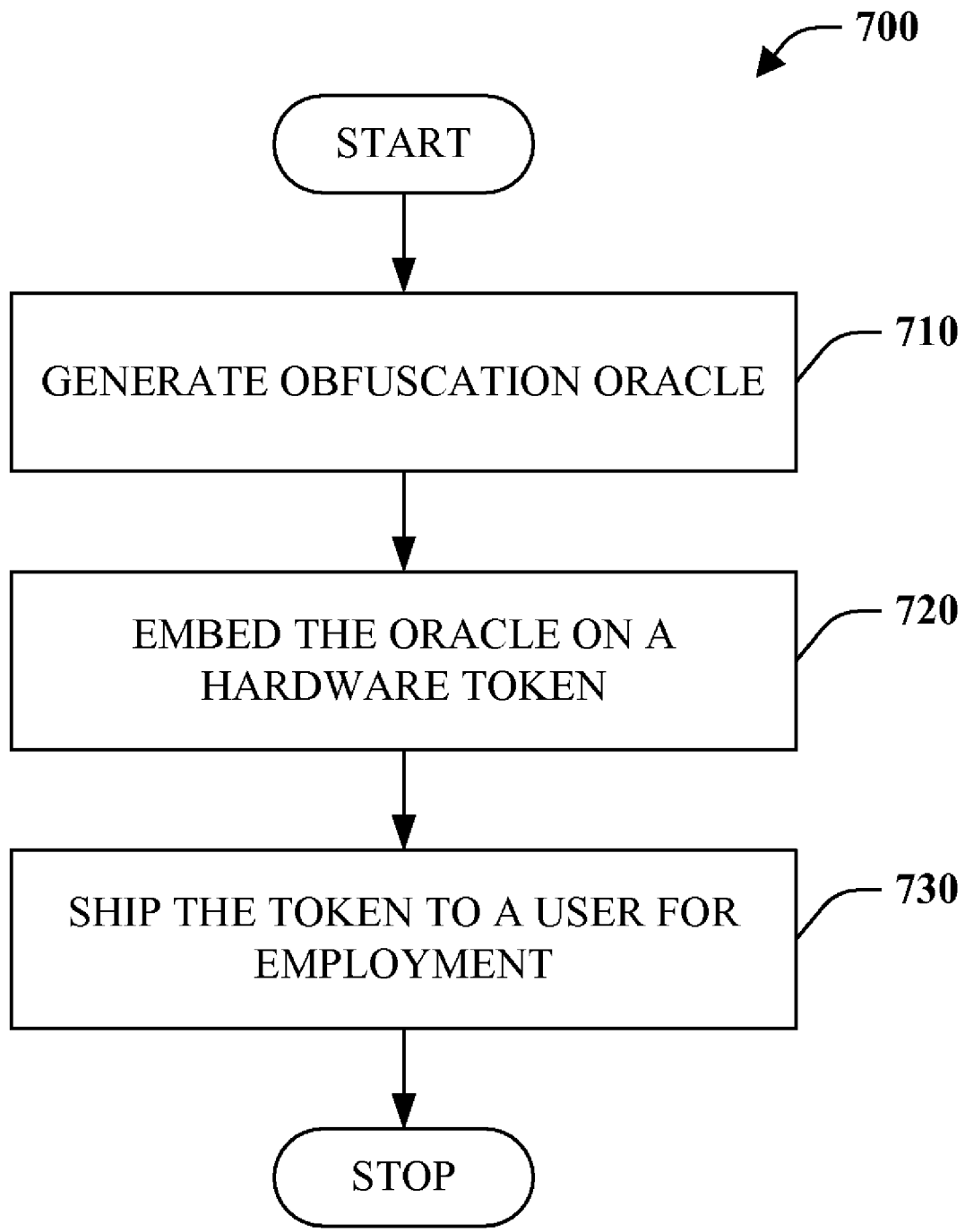
FIG. 7 is a flow chart diagram of a method of obfuscation oracle employment in accordance with an aspect of the disclosed subject matter.

FIG. 7 is a flow chart diagram depicting a method of obfuscation oracle employment 700 in accordance with an aspect of the claimed subject matter. At reference numeral 710, an obfuscation oracle can be generated that provides functionality for obfuscating and de-obfuscating a program, among other things. For example, an oracle generation algorithm can be executed that outputs a tuple "(T, $\mathcal{O}^T$)", where "$\mathcal{T}$" denotes the oracle for computing the function "T". The function "T" can include the following secretes inbuilt: secret key "S" of a public key encryption scheme (e.g., CCA-2), secret key "K" of a cryptographic MAC scheme, and a function "G" drawn from a pseudorandom function ensemble. The obfuscation function "$\mathcal{O}^T$" has a public key "P" corresponding to the secret key "S", while the oracle "$\mathcal{T}$" processes queries from an obfuscated program. At reference 720, the generated oracle and/or constituent parts are embedded on a hardware token, which can be shipped to a user for employment with respect to one or more computing devices at numeral 730.

By way of example and not limitation, an authority can execute a generation algorithm, embed the obfuscation complete circuit in a tamper proof hardware token, and ship it to a user. The description of the circuit can then be safely destroyed by the authority. Note that the size of this hardware token can be small depending solely on a security parameter and, in particular, independent of the size of a program. Once, a user acquires the token and attaches it to his computer, any software vendor (trusting the authority) can then obfuscate any number of circuits of any size (e.g., polynomial) using the public obfuscation function. A user can then download an obfuscated program or obfuscated oracle circuit, which during execution makes calls to the attached token. The token can take an input "x" from any program that queries it and simply returns "f(x)" for some fixed hidden function "f" embedded therein. Stated differently, the token is stateless and simply performs a request-reply operation. Thus, a single token can be seamlessly used concurrently by multiple programs running on a computer.

Figure 8:
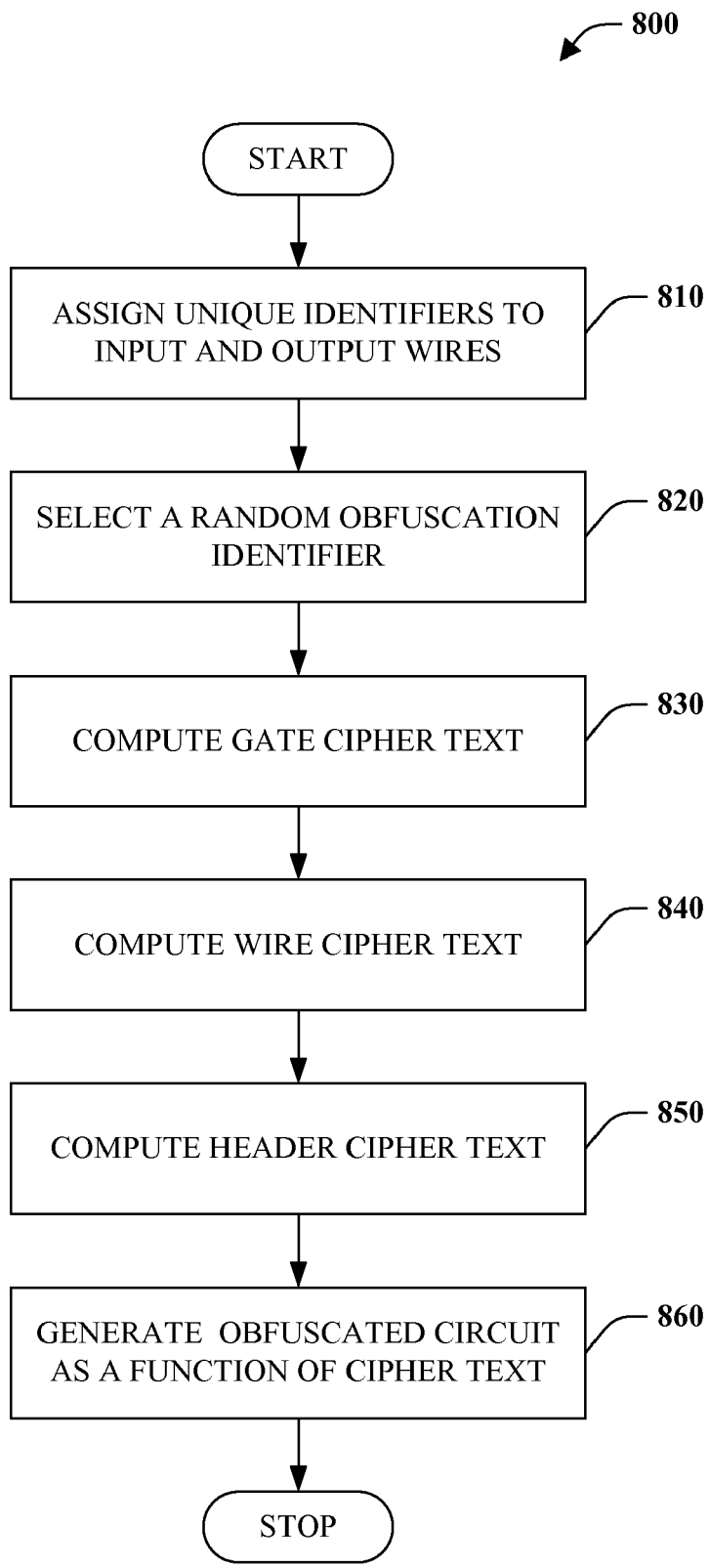
FIG. 8 is a flow chart diagram of a method of program encryption according to an aspect of the disclosure.

FIG. 8 illustrates a method 800 of program/circuit obfuscation in accordance with an aspect of the claimed subject matter. At reference numeral 810, unique identifiers are assigned to input and output wires. At numeral 820, a random obfuscation identifier is generated, for example, where the size of the identifier is at least super-logarithmic in a security parameter. At reference 830, cipher text for each gate (e.g., defined by input wires "a", "b", and output wire "c") is computed. For each wire, cipher text is computed at 840. At numeral 850, a header cipher text is computed including circuit information such as but not limited to obfuscation identifier, number of input and output wires, and the size of the circuit. Based on the generated computed cipher text, an obfuscated circuit is generated at reference numeral 860.

Figure 9:
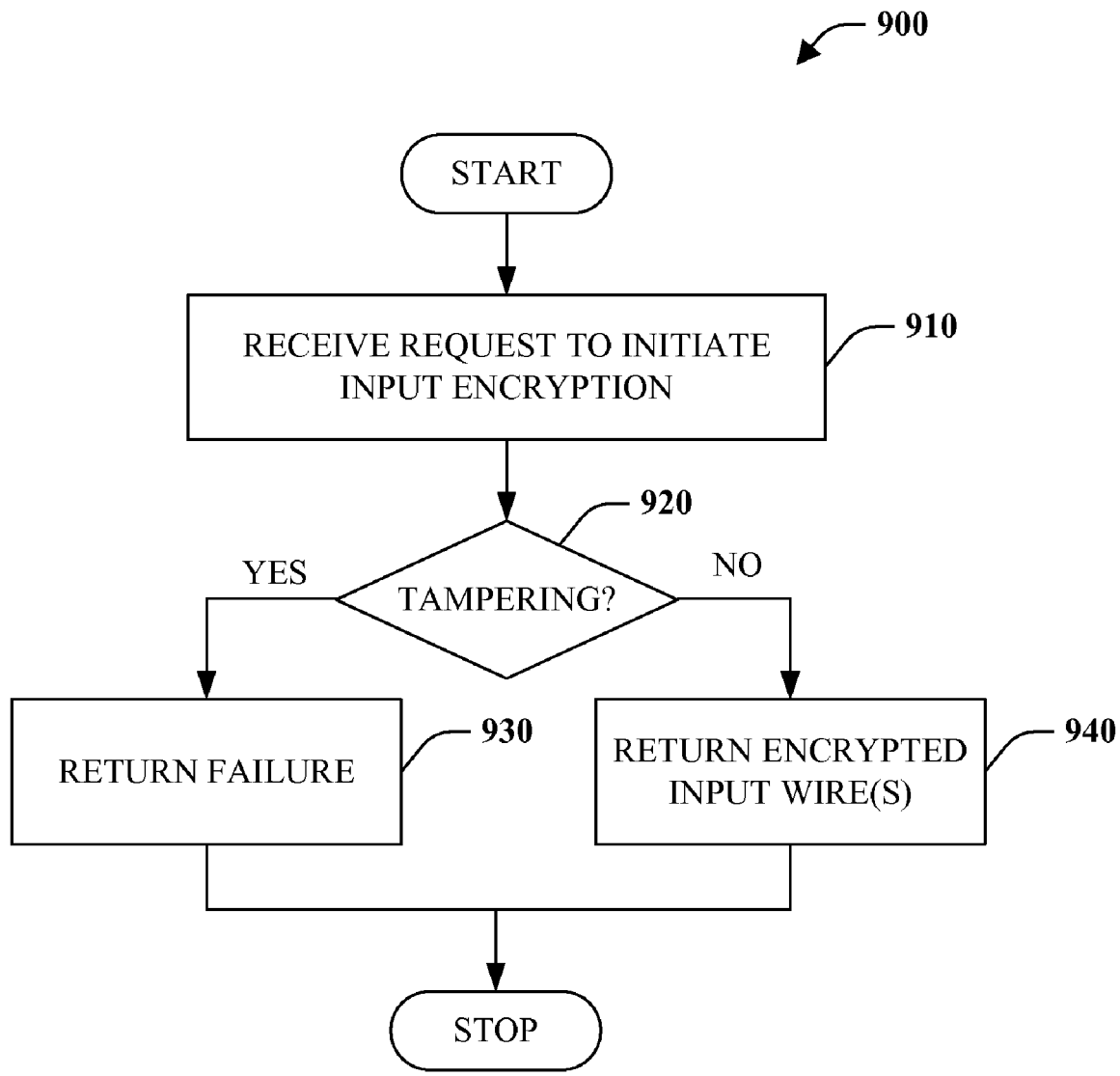
FIG. 9 is a flow chart diagram of a method of input encryption in accordance with a disclosed aspect.

FIG. 9 is a flow chart diagram of a method of input encryption 900. In accordance with one embodiment, the method 900 can be performed with respect to or by a tamper proof token. At reference numeral 910, a request is received to initiate input encryption. For example, the request can comprise one or more queries emanating from an obfuscated program/circuit. The request can include information regarding the input, the input itself, and/or information regarding the associated obfuscated program. Various preparatory computations can be spawned upon acquisition of an input encryption including message decryption and interpretation, amongst others. At reference numeral 902, one or more checks are made to determine whether or not tampering has occurred with respect to the input and/or program. By way of example and not limitation, a message authentication code associated with an input encryption query can be verified and other parameters checked for correctness. If tampering is detected at 930 ("YES"), a failure value, message, and/or output is returned. Alternatively, if tampering is not detected ("NO"), encrypted input wires or the like are returned and the method terminates.

Figure 10:
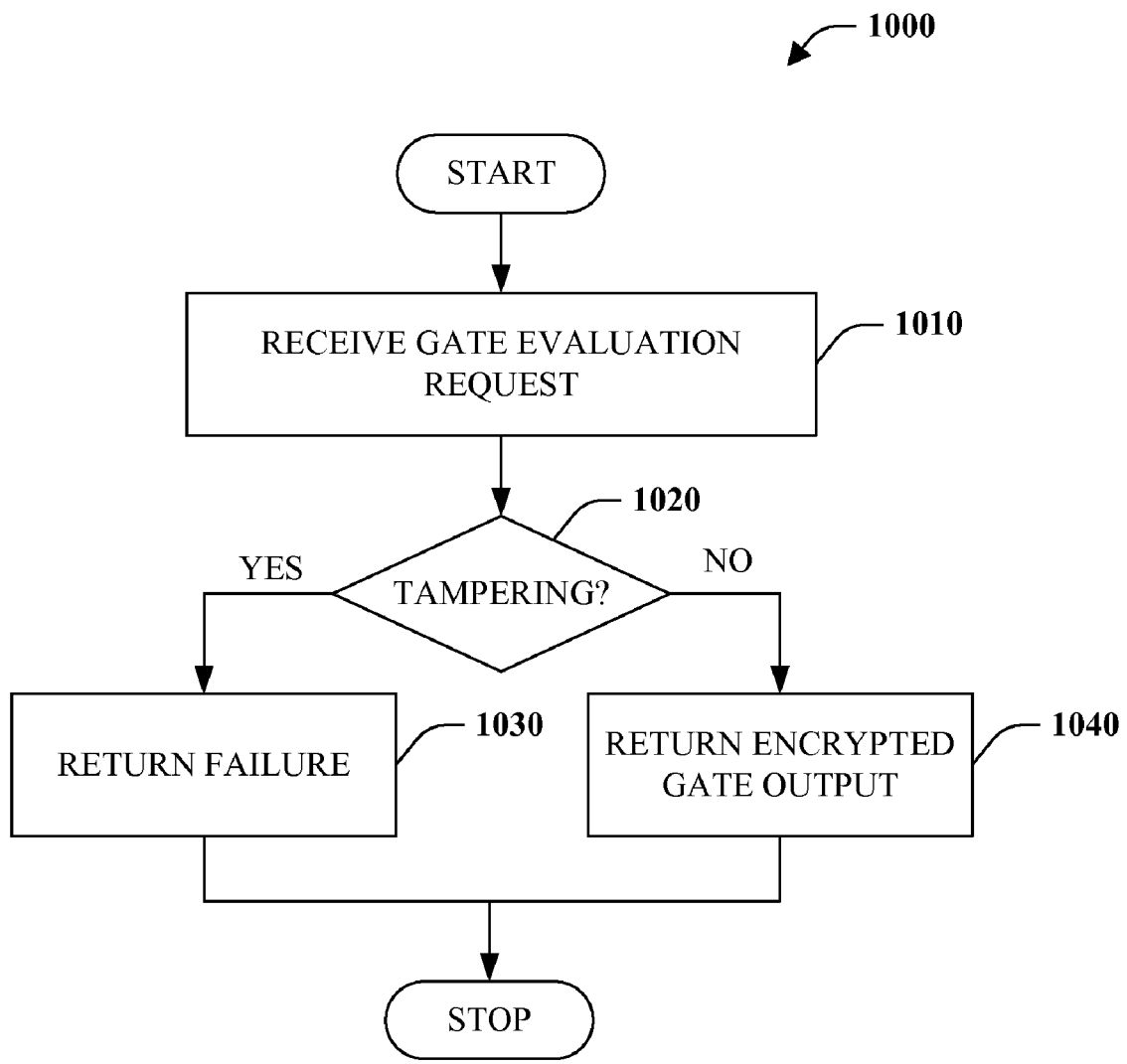
FIG. 10 is a flow chart diagram of a program evaluation method according to an aspect of the subject disclosure.

FIG. 10 depicts a method of program evaluation 1000 in accordance with an aspect of the claimed subject matter.

Again, method 1000 can be associated with hardware token or the like, but is not limited thereto. At reference 1010, a request is received to evaluate a gate or other portion of a program. For instance, this request can originate from an obfuscated program in the form of one or more queries to a corresponding tamper proof hardware token. The request can include, among other things, identification of a gate and input to the gate in an encrypted form, for example. At numeral 1020, a determination is made as to whether or not tampering has occurred with respect to the gate or gate input, among other things. For instance, each gate and/or input wire can include a message authentication code. This code can be verified using a secret key known by the processing method 1000. If tampering is identified ("YES"), failure or a signal thereof is returned at 1030. If, however, tampering is not observed ("NO"), a gate is evaluated and encrypted gate output is returned at reference numeral 1040.

Figure 11:
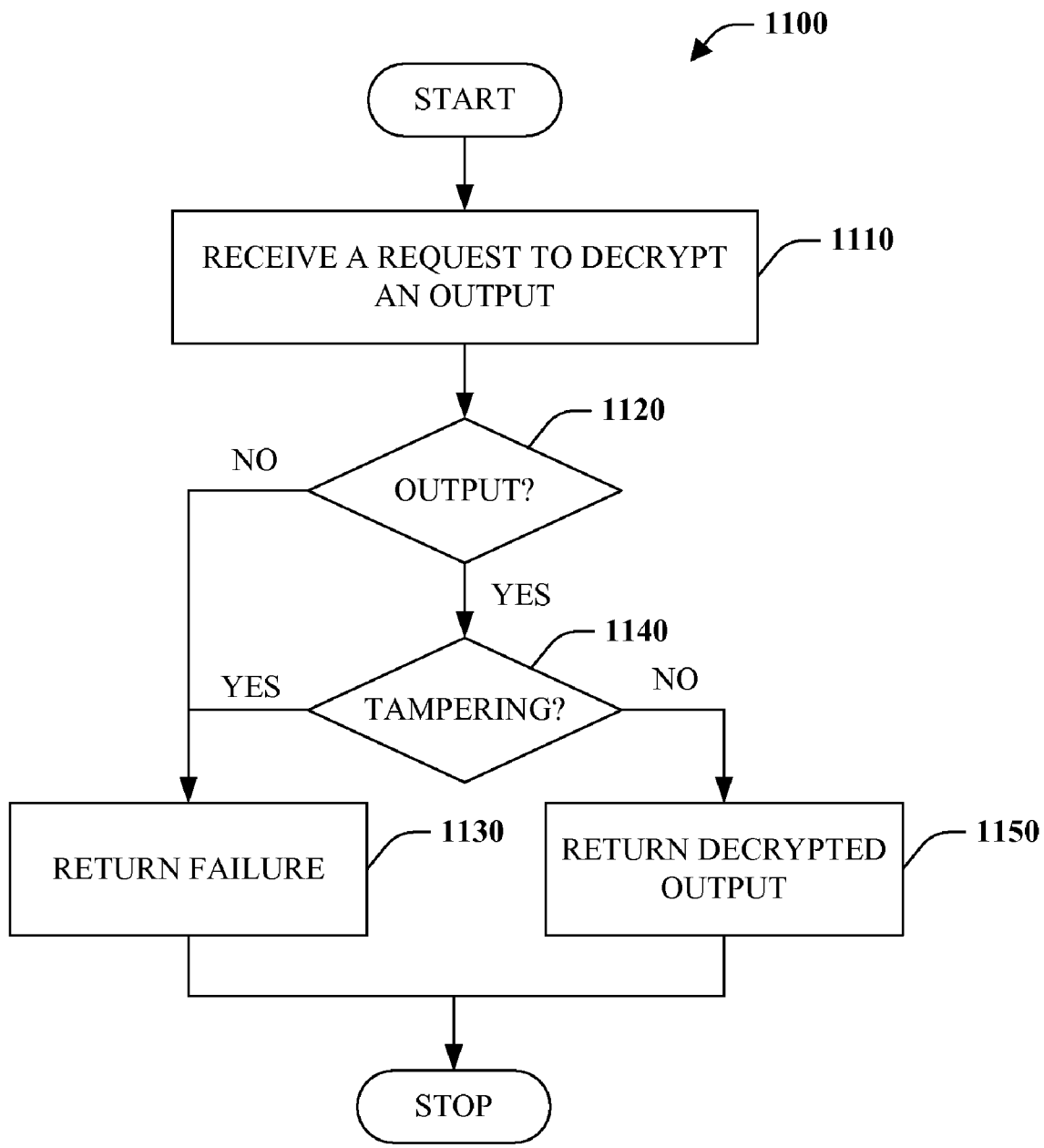
FIG. 11 is a flow chart diagram of an output decryption method in accordance with a disclosed aspect.

Referring to FIG. 11, a method of output decryption is illustrated. In accordance with one aspect of the disclosure, input and output with respect to a tamper proof hardware token or the like can be encrypted to contribute to a virtual black box model of obfuscation. However, if the final output (e.g., that which does not serve as merely as input to another gate) is encrypted, it is of no use. Accordingly, decryption can be performed by a tamper proof token or the like. At reference numeral 1110, a request can be received to decrypt an output. For example, a token can receive a query identifying an encrypted wire for decryption. At numeral 1120, a check is made to ensure that the requested value associated with a wire is actually associated with an output wire subject to decryption. If the requested value is not output subject to decryption ("NO"), a failure value, notice or the like is returned at numeral 1130. Alternatively, if identified output is eligible for decryption at 1120 ("YES"), a determination is made at 1140 concerning whether or not tampering has occurred. For instance, the determination can center on whether or not an output value was changed after computation, among other things. If tampering is detected ("YES"), a value, notice or the like is returned indicative of failure. If at 1140 tampering is not detected ("NO"), the method continues at reference numeral 1150 where the output is decrypted and returned.

Generally speaking, an obfuscation complete oracle scheme is introduced in conjunction with a tamper proof hardware token or the like to facilitate program obfuscation and tamper resistance. Execution of an oracle generation algorithm results in: (a) a secrete obfuscation complete circuit whose size is dependent solely on a security parameter, and (b) a public obfuscation function. The oracle implementing the secrete obfuscation complete circuit can be referred to as an obfuscation complete (OC) oracle. The public obfuscation function can be applied on any circuit (e.g., polynomial size) to produce an obfuscated oracle circuit. This oracle circuit can make calls to the OC oracle during execution. Informally, a security requirement can be that for every polynomial size circuit "C", whatever can be computed given access to the obfuscated circuit for "C" and the OC oracle can also be computed just given access to an oracle implementing the functionality of "C."

Assuming existence of secure public encryption (e.g., CCA-2) and collision resistant hash functions an obfuscation complete oracle scheme can be employed. This illustrates that in a world where there exists an oracle (for the obfuscation complete circuit), all polynomial circuits can be obfuscated as per the natural black box definition of security previously identified as impossible to satisfy in the plain model. In fact, this approach represents a strengthening of security model to allow for composability.

Furthermore, of the size of an original circuit is "|C|", the obfuscated oracle circuit can have size "O(|C||log(|C|))". Furthermore, during execution, the obfuscated circuit can make "O(|C||log(|C|))" queries to the OC oracle. Improving OC oracle query complexity beyond a logarithmic factor would be difficult if at all possible.

It is to be appreciated that aspects of the claimed subject matter are not limited to program obfuscation. In fact, disclosed systems and methods can be employed anywhere in which protection is desired. Accordingly, the claimed subject matter can by employed with respect to tamper proofing, virus prevention, and/or security, among other things.

The term "circuit" refers to a representation of a program in accordance with Boolean logic as commonly used in the fields of obfuscation and/or cryptography. Program obfuscation includes a compilation or transformation process of a program into an obfuscated form. During this process, a program can be transformed to or represented as a more primitive circuit over which additional transformations can be performed. Herein, the terms "program" and "circuit" are used interchangeably as they capture the same functionality and differ only in form.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 12:
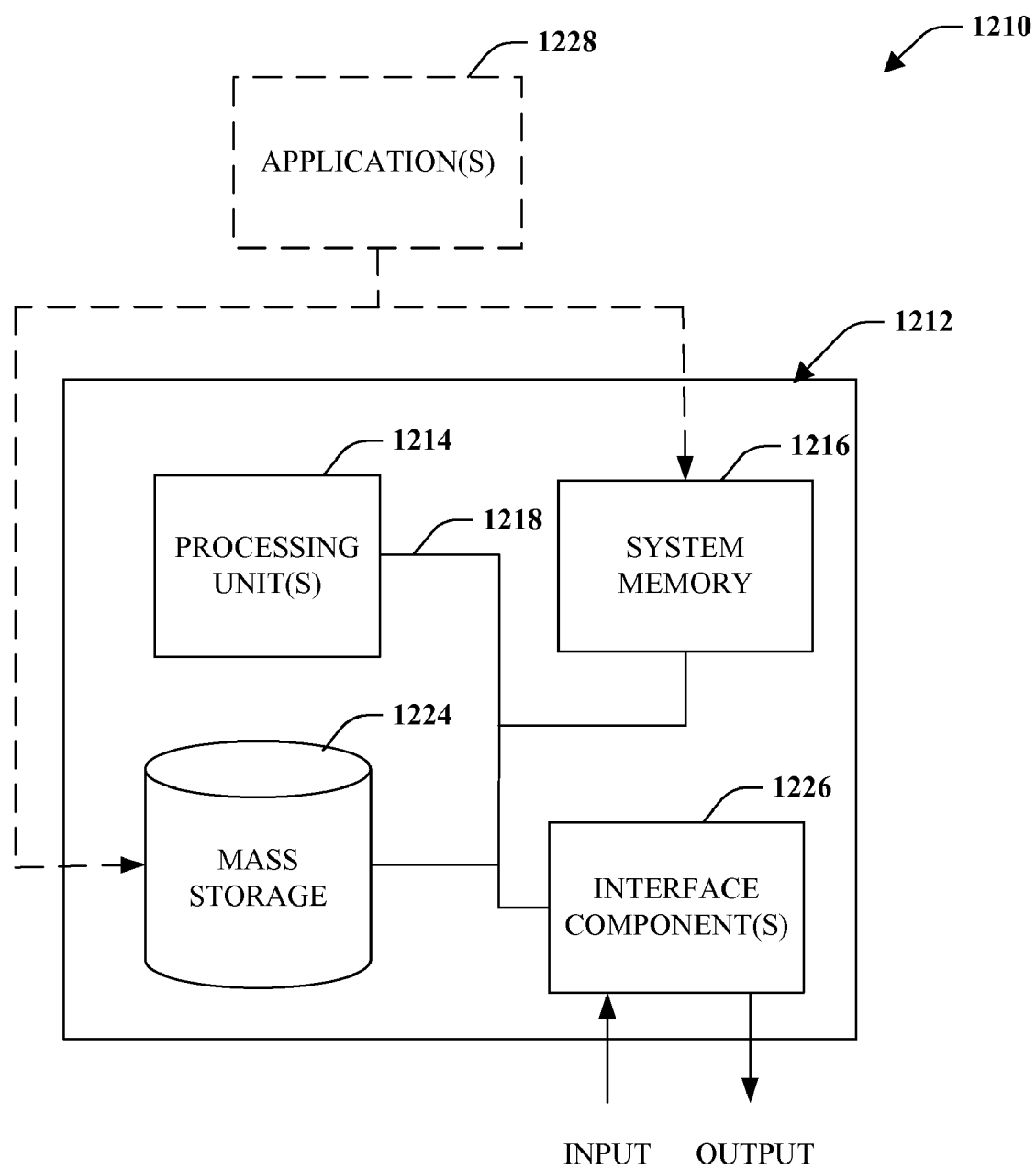
FIG. 12 is a schematic block diagram illustrating a suitable operating environment for aspects of the subject disclosure.
Figure 13:
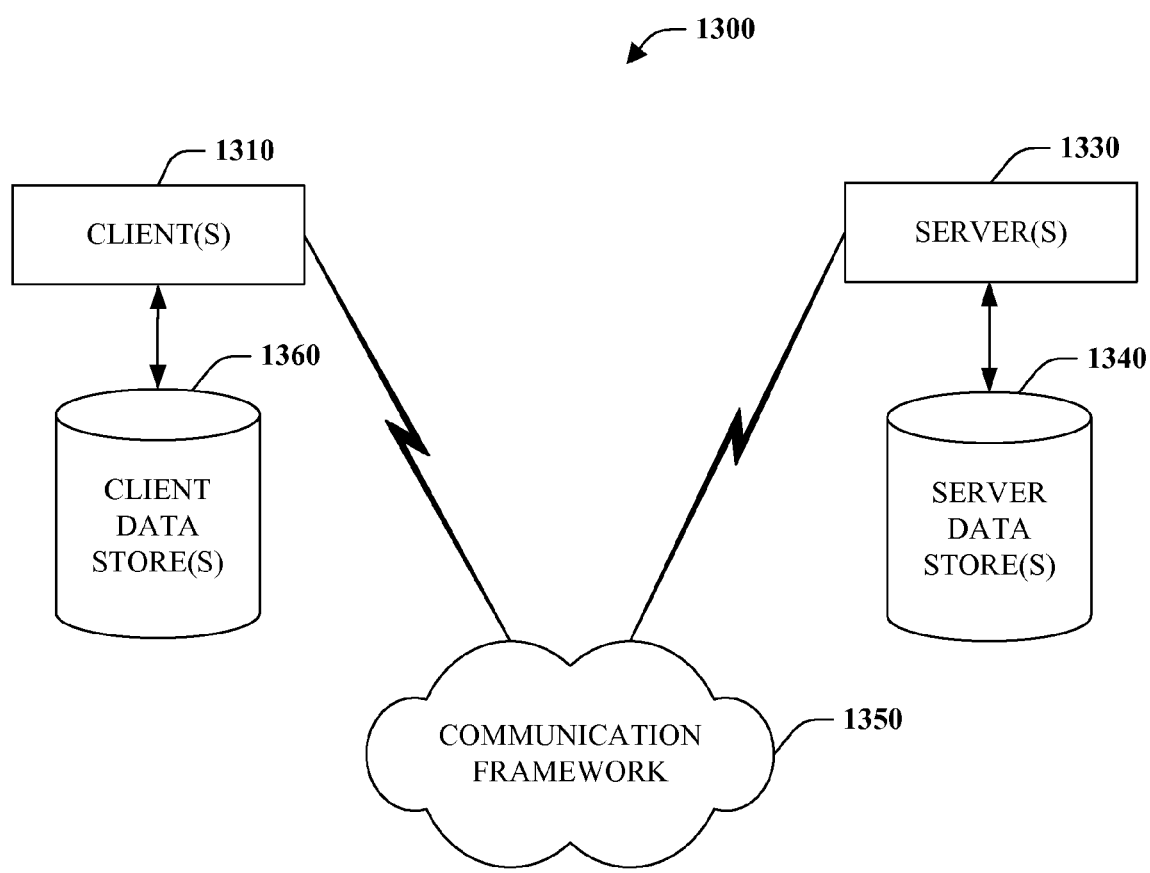
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 12, an exemplary environment 1210 for implementing various aspects disclosed herein includes a computer 1212 (e.g., desktop, laptop, server, hand held, programmable consumer or industrial electronics . . . ). The computer 1212 includes a processing unit 1214, a system memory 1216, and a system bus 1218. The system bus 1218 couples system components including, but not limited to, the system memory 1216 to the processing unit 1214. The processing unit 1214 can be any of various available microprocessors. It is to be appreciated that dual microprocessors, multi-core and other multiprocessor architectures can be employed as the processing unit 1214.

The system memory 1216 includes volatile and nonvolatile memory. The basic input/output system (BIOS), containing the basic routines to transfer information between elements within the computer 1212, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1212 also includes removable/non-removable, volatile/non-volatile computer storage media. FIG. 12 illustrates, for example, mass storage 1224. Mass storage 1224 includes, but is not limited to, devices like a magnetic or optical disk drive, floppy disk drive, flash memory, or memory stick. In addition, mass storage 1224 can include storage media separately or in combination with other storage media.

FIG. 12 provides software application(s) 1228 that act as an intermediary between users and/or other computers and the basic computer resources described in suitable operating environment 1210. Such software application(s) 1228 include one or both of system and application software. System software can include an operating system, which can be stored on mass storage 1224, that acts to control and allocate resources of the computer system 1212. Application software takes advantage of the management of resources by system software through program modules and data stored on either or both of system memory 1216 and mass storage 1224.

The computer 1212 also includes one or more interface components 1226 that are communicatively coupled to the bus 1218 and facilitate interaction with the computer 1212. By way of example, the interface component 1226 can be a port (e.g., serial, parallel, PCMCIA, USB, FireWire . . . ) or an interface card (e.g., sound, video, network . . . ) or the like. The interface component 1226 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer, and the like. Output can also be supplied by the computer 1212 to output device(s) via interface component 1226. Output devices can include displays (e.g., CRT, LCD, plasma . . . ), speakers, printers, and other computers, among other things.

FIG. 13 is a schematic block diagram of a sample-computing environment 1300 with which the subject innovation can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing the aspects of the subject innovation, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client (s) 1310 are operatively connected to one or more client data store(s) 1360 that can be employed to store information local to the client(s) 1310. Similarly, the server(s) 1330 are operatively connected to one or more server data store(s) 1340 that can be employed to store information local to the servers 1330.

Client/server interactions can be utilized with respect with respect to various aspects of the claimed subject matter. By way of example and not limitation, a client 1310 including an embedded hardware or association with a specific hardware token can acquire obfuscated programs for execution from one or more servers 1330 across the communication framework 1350. Furthermore, a client 1310 can represent a software vendor that acquires a public obfuscation function over the communication framework from a server 1330 and then provides an obfuscated program for download on one or more servers 1330.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A program obfuscation system, comprising:
a hardware token including a secret oracle component, the hardware token and the secret oracle component having a stateless operation to enable interacting concurrently with multiple obfuscated program components, the secret oracle component enabling use of an execution identity for an entire execution to facilitate security when interacting concurrently with the multiple obfuscated program components;
an obfuscated program component of the multiple obfuscated program components, produced by a public obfuscation function corresponding to the secret oracle component, that includes queries to the secret oracle component included in the hardware token to facilitate evaluation of the obfuscated program component, the secret oracle component to assign a secret obfuscation identity to each of the queries, the obfuscated program component obfuscated as a universal circuit; and
an evaluation component that detects unauthorized modification with respect to the obfuscated program component or input based in part on message authentication codes in conjunction with input encryption, program evaluation, and output decryption.

2. The system of claim 1, wherein the hardware token and secret oracle component restrict queries to a fixed size.

3. The system of claim 1, wherein the secret oracle component includes an encryption component that encrypts program input in response to one or more queries.

4. The system of claim 3, further comprising an injection component that injects a message authentication code within the input to facilitate tamper detection.

5. The system of claim 1, wherein the secret oracle component includes an input component that receives encrypted input, evaluates a portion of the program, and returns encrypted results.

6. The system of claim 5, further comprising a tamper component that generates the message authentication code associated with the encrypted results to facilitate tamper detection.

7. The system of claim 5, further comprising a decryption component that decrypts the results.

8. A method of program obfuscation, comprising:
receiving queries including encrypted information from a plurality of obfuscated universal circuit representations of programs, by a computer including a memory and a processor, the plurality of obfuscated universal circuit representations of programs comprising one or more input wires;
assigning a secret obfuscation identity to each of the queries;
processing the queries in parallel at a secret oracle component having a stateless operation, the secret oracle component enabling use of an execution identity for an entire execution to facilitate security when processing the queries in parallel, the secret oracle component included in a hardware token;
returning encrypted results to at least one of the plurality of obfuscated universal circuit representations;
receiving message authentication codes associated with one or more input wires to detect unauthorized modification; and
verifying input authentication utilizing the message authentication codes prior to evaluation in conjunction with the encrypted information, evaluation of the querying program, and output decryption.

9. The method of claim 8, further comprising receiving at least one input encryption query and returning an encrypted version of each input wire in the universal circuit.

10. The method of claim 9, further comprising outputting a message authentication code for each input wire of the universal circuit to facilitate identification of input alteration subsequent to encryption.

11. The method of claim 8, further comprising receiving a gate evaluation query including encrypted versions of the input wires and the gate and returning an encrypted version of the gate evaluation result.

12. The method of claim 8, further comprising receiving a query for decrypted output for a gate wire, decrypting the output, and returning the value.

13. The method of claim 12, further comprising authenticating encrypted data received with the query, and verifying that the wire is an output wire prior to returning the value.

14. A method of program obfuscation comprising:
acquiring, by a computer including a memory and a processor, a public obfuscation function;
applying the function to a circuit representation of a program to generate an obfuscated universal circuit that includes queries to an oracle that is tamper resistant and stateless, the oracle to process multiple queries from multiple programs in parallel, to assign a secret obfuscation identity to each of the multiple queries, the oracle enabling use of an execution identity for an entire execution to facilitate security when processing the multiple queries from the multiple programs in parallel, and to facilitate evaluation of the obfuscated universal circuit, wherein the oracle is included in a hardware token; and
detecting unauthorized modification of the obfuscated universal circuit or input based in part on message authentication codes, input encryption, program evaluation and output decryption.

15. The method of claim 14, further comprising acquiring the public obfuscation function from a particular user possessing the corresponding oracle.

16. The method of claim 14, further comprising acquiring the public obfuscation function from a token creation authority that creates the public obfuscation function and provides the corresponding oracle to a user.

* * * * *